(12) United States Patent
Beckford et al.

(10) Patent No.: US 8,366,378 B2
(45) Date of Patent: Feb. 5, 2013

(54) BLADE ASSEMBLY

(75) Inventors: Peter Rowland Beckford, Derby (GB);
Simon Read, Derby (GB); Ian Colin Deuchar Care, Derby (GB)

(73) Assignee: Rolls-Royce PLC (GB)

( * ) Notice: Subject to any disclaimer, the term of this patent is extended or adjusted under 35 U.S.C. 154(b) by 655 days.

(21) Appl. No.: 12/547,644

(22) Filed: Aug. 26, 2009

(65) Prior Publication Data
US 2010/0054942 A1    Mar. 4, 2010

(30) Foreign Application Priority Data
Aug. 27, 2008    (GB) .................................... 0815483.3

(51) Int. Cl.
*F01D 5/30* (2006.01)

(52) U.S. Cl. ................. 415/9; 416/2; 416/234; 416/248

(58) Field of Classification Search .......... 415/9; 416/2, 416/219 R, 229 R, 234, 239, 213 R, 248
See application file for complete search history.

(56) References Cited

U.S. PATENT DOCUMENTS

| | | | |
|---|---|---|---|
| 2,362,804 A | 11/1944 | Cox, Jr. | |
| 2,859,936 A | 11/1958 | Warnken | |
| 2,925,250 A | 2/1960 | Whitehead | |
| 3,057,767 A | 10/1962 | Kaplan | |
| 3,132,841 A | 5/1964 | Wilder, Jr. | |
| 3,519,368 A | 7/1970 | Howald et al. | |
| 3,679,324 A | 7/1972 | Stargardter | |
| 3,744,927 A | 7/1973 | Bernaerts | |
| 3,749,518 A | 7/1973 | Alver et al. | |
| 3,756,745 A | 9/1973 | Alver et al. | |
| 4,040,770 A | 8/1977 | Carlson | |
| 4,111,600 A | 9/1978 | Rothman et al. | |
| 4,343,593 A | 8/1982 | Harris | |
| 4,492,521 A * | 1/1985 | Pask et al. ................. | 416/193 A |
| 4,730,984 A | 3/1988 | Ortolano | |
| 5,018,271 A | 5/1991 | Bailey et al. | |
| 5,160,243 A | 11/1992 | Herzner et al. | |
| 5,176,499 A * | 1/1993 | Damlis et al. ............... | 416/97 R |
| 5,314,307 A | 5/1994 | Farmer | |
| 5,340,280 A | 8/1994 | Schilling | |
| 5,405,102 A | 4/1995 | Greene | |
| 5,443,367 A | 8/1995 | Samit et al. | |

(Continued)

FOREIGN PATENT DOCUMENTS

| | | |
|---|---|---|
| EP | 1555391 A2 | 7/2005 |
| EP | 1881158 A2 | 1/2008 |

(Continued)

*Primary Examiner* — Edward Look
*Assistant Examiner* — Liam McDowell
(74) *Attorney, Agent, or Firm* — McCormick, Paulding & Huber LLP (57) ABSTRACT

Blade assemblies are provided in a number of forms. These blade assemblies may have blades secured to disks (blisk), rings (bling) and drums (blum). The blades and/or the rotor elements formed by these rings, drums or disks can fragment and it is necessary to contain such fragments within a casing. Impact energy has a significant effect upon the necessary thickness of the casing to ensure containment. By providing blades as well as rotor elements which incorporate discontinuities which provide flexing under impact, energy is absorbed prior to further fragmentation upon impact engagement with a casing surface; flexing is about the discontinuity. In such circumstances casings may be thinner and therefore significant weight savings achieved with regard to aircraft incorporating gas turbine engines having blade assemblies with discontinuities.

13 Claims, 4 Drawing Sheets

U.S. PATENT DOCUMENTS

| | | |
|---|---|---|
| 5,490,764 A | 2/1996 | Schilling |
| 5,749,706 A * | 5/1998 | Maar ........................ 416/220 R |
| 6,402,469 B1 | 6/2002 | Kastl et al. |
| 6,431,837 B1 | 8/2002 | Velicki |
| 6,467,168 B2 * | 10/2002 | Wallis ...................... 29/889.721 |
| 6,536,208 B1 | 3/2003 | Kretschmer |
| 6,609,884 B2 | 8/2003 | Harvey |
| 6,739,049 B2 | 5/2004 | Nicholson |
| 7,025,560 B2 | 4/2006 | Clark |
| 7,112,044 B2 | 9/2006 | Whitehead et al. |
| 7,118,346 B2 | 10/2006 | Read |
| 7,311,500 B2 * | 12/2007 | Rongong et al. .............. 416/230 |
| 7,758,311 B2 * | 7/2010 | Loehle et al. ............. 416/196 R |
| 8,016,561 B2 | 9/2011 | Moniz et al. |
| 2005/0158171 A1 | 7/2005 | Carper et al. |
| 2008/0019838 A1 | 1/2008 | Read et al. |
| 2010/0054938 A1 | 3/2010 | Beckford et al. |

FOREIGN PATENT DOCUMENTS

| | | |
|---|---|---|
| FR | 2712631 A | 5/1995 |
| GB | 1332679 | 11/1970 |
| GB | 1473417 | 5/1977 |
| GB | 2323637 A | 9/1998 |
| GB | 2399866 A | 9/2004 |
| JP | 9089709 A | 4/1997 |
| WO | 96/34181 | 10/1996 |
| WO | 2007048996 A1 | 5/2007 |

* cited by examiner

BLADE ASSEMBLY

CROSS REFERENCE TO RELATED APPLICATION

This application is entitled to the benefit of British Patent Application No. GB 0815483.3, filed on Aug. 27, 2008.

FIELD OF THE INVENTION

The present invention relates to blade assemblies and more particularly to blade assemblies formed as blisk (integrally bladed disk), bling (integrally bladed ring) or blum (integrally bladed drum) assemblies in gas turbine engines.

BACKGROUND OF THE INVENTION

Figure 1:
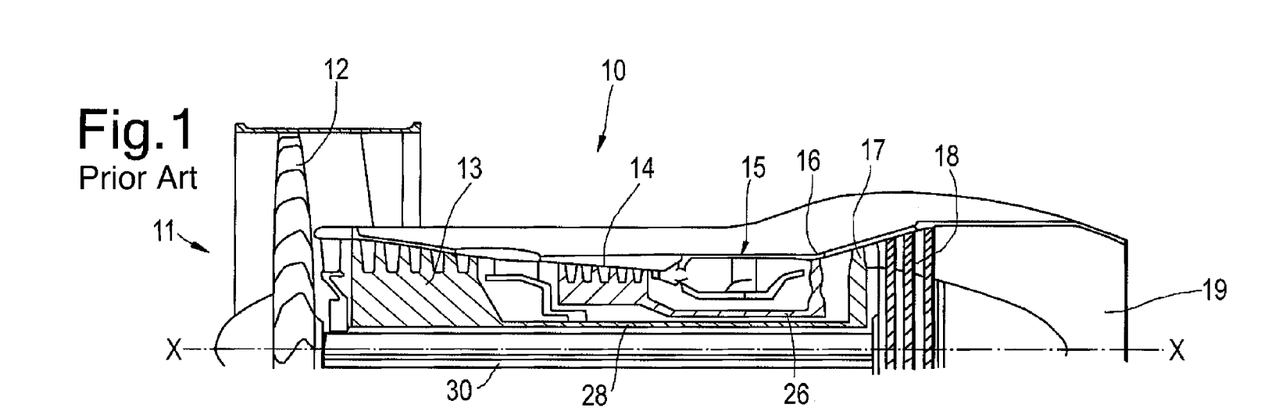
FIG. 1 is a simplified schematic illustration in section of a portion of a gas turbine engine.

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts 26, 28, 30.

In view of the above, it will be appreciated that a number of blade assemblies are provided in compressor and turbine stages of a gas turbine engine. These blade assemblies may disintegrate for a number of reasons such as fatigue, impacts and mechanical failures. In such circumstances, parts of the blade assembly will impact a containment casing. In order to ensure that, particularly with regard to gas turbine engines utilised in aircraft, such fragments do not exit the engine, it is necessary to include a casing, which is sufficiently strong to prevent fragment escape. In such circumstances, consideration is made with regard to energy transferred by blade fragments to the casing during impacts. Reductions in casing thickness will reduce significantly the weight of the casing and therefore increase its acceptability with regard to use in an aircraft.

In view of the above, it has been known to introduce lines of weakness within blade arrangements in order to precipitate, when appropriate, fragmentation of blade segments into manageable sizes with reduced impact energy and therefore impact penetration potential with regard to casings. Such lines of weakness are drilled or machined or moulded into the blade assembly whether it be of a metal or composite form in order to define appropriate break lines. Unfortunately, introducing such lines of weakness in the form of grooves will create moisture paths, which may precipitate cracking. Such problems are further exacerbated if to reduce blade assembly weight hollow sections are created into which moisture can enter and cause "freeze thaw" cycling and again cracking which may result in premature failure of the blade arrangement.

Machining to introduce lines of weakness can also result in latter stage tool breakage and so rejection of a blade assembly. Furthermore a hollow cavity root within a blade can cause stress concentration in an already relatively high stressed region of a blade assembly. Furthermore, the radial extent of the cavity is limited by manufacturing processes available. The above problems with regard to blade disintegration are exacerbated with regard to blisk (bladed disk) blade assemblies having blades secured to a disc, bling (bladed ring) blade assemblies where a blade is secured to a ring and blum (bladed drum) blade assemblies where a blade is secured to a drum. These problems occur whether the blade assembly is made from a metal or composite.

The disadvantage of a conventional blisk or bling or blum blade arrangement is that the failure can lead to a further failure of the whole and complete structure. If the whole blade arrangement fails then segments released can be of relatively high energy and therefore cause difficulties with regard to containment within a casing.

SUMMARY OF THE INVENTION

According to a first aspect of the present invention, a blade assembly includes an integral rotor element; a plurality of blade elements secured to a circumferential edge of the rotor element, at least one of the rotor elements or the blade elements having an enclosed discontinuity therein. The enclosed discontinuity extends radially and/or circumferentially to allow intermediate flexing of the respective rotor element and/or blade element upon impact prior to fracture.

According to another aspect of the present invention, a method of making a blade assembly includes the steps of defining a first layer or laminate for the blade assembly, applying a mask incorporating a blank to define discontinuities, applying a second laminate layer, and applying any further masked layers and laminate layers until a desired blade structure is achieved.

The invention provides a blade arrangement, a method of making such an arrangement, and a gas turbine engine incorporating such an arrangement, as set out in the claims.

DETAILED DESCRIPTION OF THE PREFERRED EMBODIMENTS

As indicated above, a particular problem with regard to disintegration of blade assemblies is the potential for relatively large segments to impact upon a casing. Such segments will have a high impact energy and therefore present significant impact loads to the casing. These impact loads must be contained and therefore with prior arrangements potentially stronger, thicker and heavier casings are required than would be desirable.

Aspects of the present invention relate to consideration of blade segments in particular but also rotary elements upon which the blade segments are secured in order to define a blade assembly. Typically, there will be a failure on disintegration between the blade and an integral rotor element such as a ring or a disk or a drum. For example, a weld or an adhesive joint, which joins the blade to the rotary element may fail, or there may be a failure in the base material of the ring, disk or drum.

Figure 2:
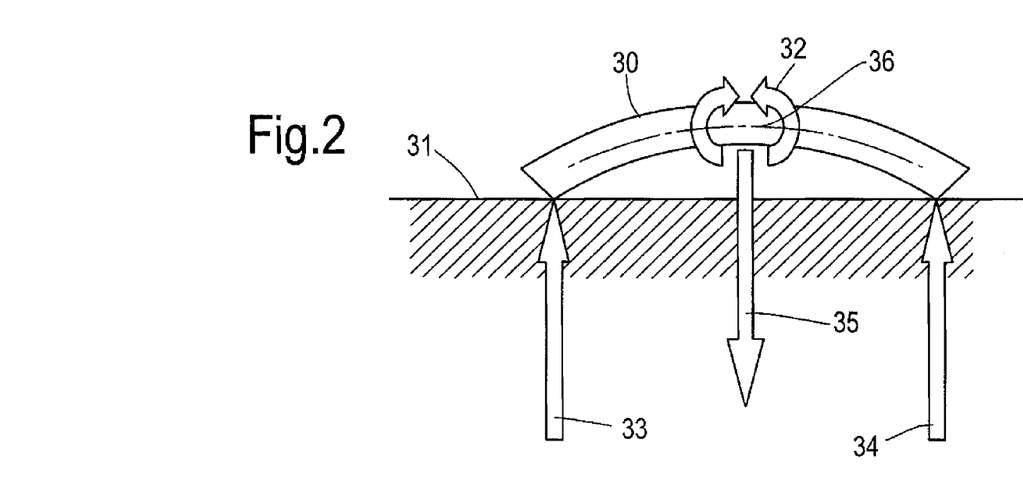
FIG. 2 is a schematic cross section of a blade assembly fragment under impact with a casing.

FIG. 2 provides a schematic illustration of a blade fragment 30 under impact with a casing 31. The fragment 30 has a large bending moment 32 as a result of impact reactions with the casing at points 33, 34 and a resultant fragment velocity in the direction of arrowhead 35. In accordance with the invention, discontinuities 36 are provided within the fragment 30. Increased nominal stress at the discontinuity due to a reduced load bearing area plus an increase in compliance at these discontinuities 36 will result in plasticity/cracking within the fragment 30. As a result of such plastic (non-elastic) hinge deformation of the fragment 30, the fragment 30 will flatten and hence increase the contact area with the casing 31 whilst absorbing energy. This will absorb impact energy as well as potentially further fragmenting the fragment 30 to more acceptable impact load energy levels.

By creating discontinuities as indicated blade arrangements are provided which can utilise plasticity in the form of intermediate flexing prior to further overall flexing of the blade fragment 30.

In order to define the discontinuities existing manufacturing techniques can be adopted and utilized, particularly where the blade is of a composite or fabricated construction. In such circumstances, when forming the blade in a composite form, it will be appreciated that generally layers of laminates are combined and appropriately associated and bonded together. In such circumstances in order to create discontinuities in accordance with aspects of the present invention slots or blanks will be cut into a masking layer. These slots or blanks will therefore blank adhesion between adjacent portions of the blade to create the discontinuity. The discontinuities can be created in the blades themselves as well as in the rotor element whether that be a ring, disk or drum. In terms of further procedures, the blank itself may create the discontinuity if formed from other materials having less strength or coated or otherwise formed to prevent bonding with laminates either side. In such circumstances as described above slippage and deformation about the discontinuity will facilitate plasticity and cracking which dissipates impact energy.

A stop-off material may be applied to the inner layer(s) prior to bonding, such as in a Diffusion Bonding process. The areas where the stop-off has been applied may subsequently be enlarged or re-shaped by such as a Super-plastic Forming process.

The discontinuities in such circumstances may effectively provide no bonding. Alternatively, discontinuities can be formed as voids and in such circumstances the blanks utilised in the discontinuity forming masks may be removed through an appropriate process. With the blanking material then removed voids are created as discontinuities within the blade and/or the rotor disks. These voids may be filled with an appropriate material having a reduced mechanical strength in comparison with the remainder of the blade or rotor element, or simply not bond to the remainder of the structure. In such circumstances problems with ingress of moisture are avoided. Generally, discontinuities in accordance with aspects of the present invention are enclosed in order to avoid creation of moisture ingress pathways. With regard to voids, this can be done by plugging any holes used for removal of the blanking material or to create masks which have slots cut into them and therefore upon formation of the blade or root element in the blade arrangement voids will be created where the slots are presented in the masking layer. Possibly, the voids are closed by the joining of the blade sections on the disc, ring, or drum section.

The void created by the removal of the mask may alternatively be filled by a material that performs some additional function in the component, such as that of damping vibration.

The discontinuities in accordance with aspects of the present invention will be positioned and distributed within the blades as well as the rotor elements for operational effect. In such circumstances, discontinuities may be evenly and equally spaced and distributed or unevenly and unequally spaced within the blade or rotor element dependent upon requirements (such as balance and moment weight adjustment). Furthermore, the depth and width of the discontinuities may vary dependent upon requirements.

Discontinuities in accordance with aspects of the present invention are provided principally in order to create flexibility, which will result in plasticity and cracking dissipating impact energy prior to impact. It will be understood that these discontinuities may be separate from each other. Alternatively, discontinuities may be linked within the same blade or blade portion or to other blade portions as well as to the integral rotor element such as a ring, a disk or a drum. In such circumstances, flex and deformation paths are created within the blade arrangement, which will facilitate energy dissipation upon impact.

Figure 3:
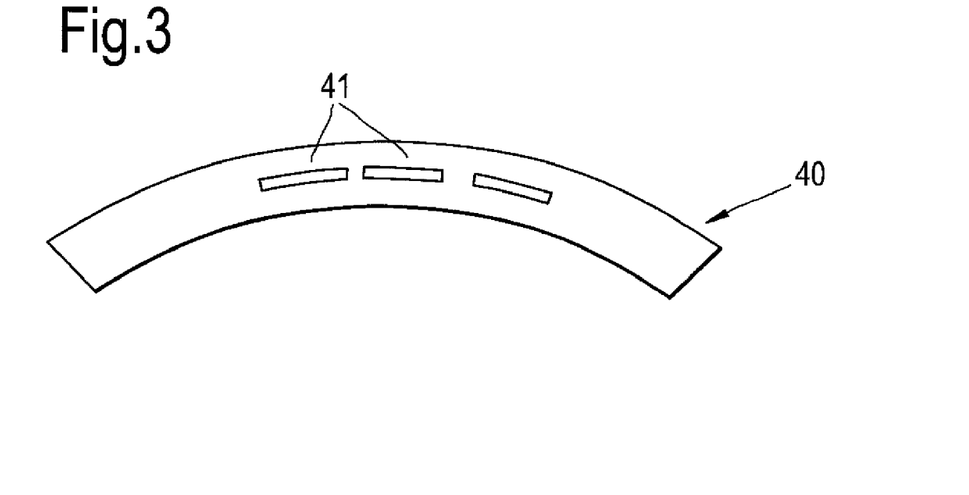
FIG. 3 is a schematic cross section of a blade assembly in accordance with the invention.

FIG. 3 provides a schematic cross section across a release plane for a blade fragment 40 in accordance with aspects of the present invention. Slots 41 are presented within the blade section 40. The slots 41 act as discontinuities to provide the flexing and therefore energy absorption prior to fracture in accordance with aspects of the present invention. Generally the discontinuities created by the slots 41 may line up with similar discontinuities in an underlying integral rotor element associated with the blade 40. Such discontinuity continuation between the blade 40 and an underlying integral rotor element may facilitate break up of the blade assembly comprising the blade 40 and the integral rotor element about the bond, whether that be welded or adhesive between the blade 40 and the rotor element.

Generally, the cross section depicted in FIG. 3 with regard to a blade 40 is of a section most likely for a lower blade 40 section to fail. In such circumstances, the slots 41 and any area of discontinuity will tend to extend up into the blade again to facilitate flexing upon impact prior to fracture. The slots 41 are enclosed and generally their position within the blade 40 will be such that after initial energy absorption through flexing upon impact, the slots 41 as discontinuities will present lines of weakness, which will facilitate desired further fragmentation of the blade 40 in use.

The slots may be filled with radial fibres. These will add centrifugal strength to the blade, but are weak in the direction of bending on impact. In a carbon fibre reinforced polymer (CFRP) blade, these may be unidirectional carbon fibres. The carbon fibres may be coated (for example with nickel or titanium boride when used with aluminium) to prevent them reacting with the material. In a metal matrix composite (MMC), these may be metal, boron, silicon carbide, or organic fibres.

Figure 4:
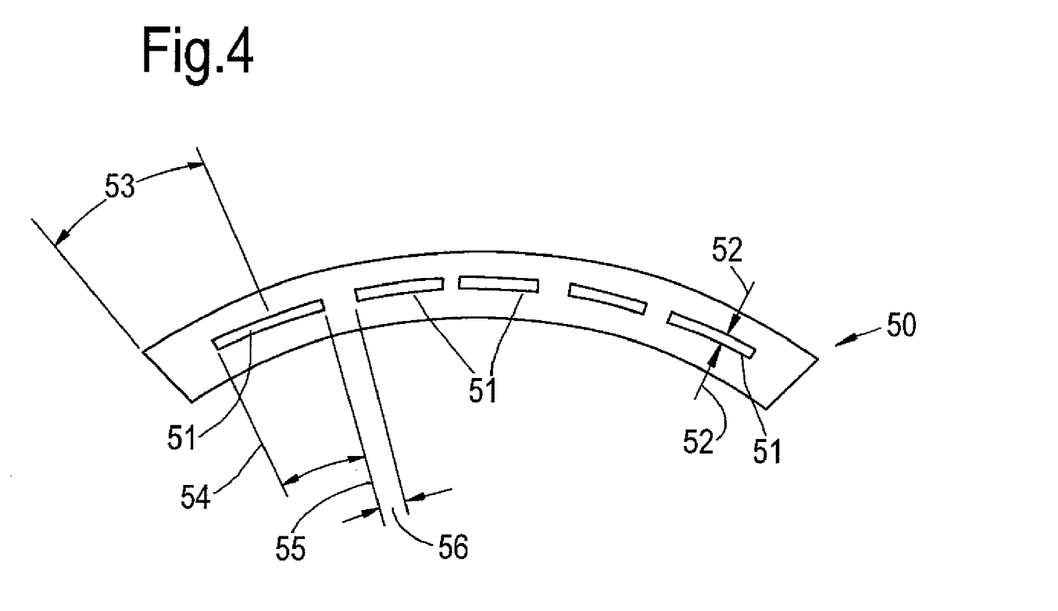
FIG. 4 is a schematic cross section illustrating the location of discontinuities in a blade segment in and engine made in accordance with the invention.

FIG. 4 provides a further cross section of a blade 50 in accordance with the invention. Slots 51 provide discontinuities within the blade 50. These discontinuities may be voids or the slots 51 may be filled with a material of a lower (circumferential) strength than the blade 50 or not be bonded such that the blade 50 will flex and crack under impact loads dissipating energy prior to further fragmentation of the blade 50.

It will be appreciated that the slots 51 provide dislocations as indicated within the blade 50. These dislocations may extend along the blade 50 such that an original three slot format as depicted in FIG. 3 may extend through branching into multiple slots 51 as depicted in FIG. 4. The number of slots will generally be chosen in order to create the desired flexing for energy dissipation within the blade 50. Similarly with regard to rotary elements slots and other forms of discontinuity will be provided in order to create the desired fragmentation as well as flexing for energy dissipation upon impact with a casing.

With regard to slots 51, the width or height 52 of each slot 51 will be dependent upon position and would be typically created through as indicated above provision of masking elements within a membrane forming part of the blade 50. The width 52 as well as length and height will be determined by mask or blank elements or otherwise in order to create the desired discontinuities within the blade 50. It will be noted that each slot 51 will generally have an angular position 53 relative to an edge of the blade 50. Furthermore the position of respective edges 54, 55 and so the width in a circumferential direction of the slot 51 will be chosen in order to provide the desired flexing and therefore impact energy absorption in accordance with aspects of the present invention. The angular position of the slots 51 whether determined with regard to the edges 54, 55 or a centre of each slot 51 may vary and will not necessarily be regular throughout the blade 50. Similarly, angular separation 56 between the slots 51 may be varied and need not be regular in order to create the desired discontinuity positions within the blade 50 and therefore response to impact loads.

In view of the above, it is discontinuities in the form of slots, whether filled with materials such as foam to provide a lower mechanical strength compared to the remainder of blade or rotor element or otherwise which can vary in terms of length, angle and height through the blade in order to create the desired plasticity response. Furthermore, the slots can be straight or slightly curved in cross section as well as wavy or assume any other form in order to create the desired slippage and cracking in deformation for energy absorption within the blade 50.

As indicated above it is conventional to secure blades in order to create blisk (blade elements secured to a disk), bling (blade elements secured to a ring) or blum (blade elements secured to a drum) arrangements. Typically the blade elements will include a root section, which engages a reciprocal root aperture in the ring or a stub on the ring, disk or drum forming the rotary element. In such circumstances the blades and the rotor element will be integrally formed in use. Such integration is further emphasised with bling, blisk and blum blade assemblies in which the blades are secured to a peripheral edge of the respective rotor element (ring, drum, disk) through a weld. Such assembly is relatively convenient but it will be appreciated creates stress at the weld junction which may cause one or more blades to fragment and separate from the integral rotor element. These blades in particular must be contained within the casing.

The rotor element can be formed as a casting or from a composite including metal, organic, alumina, silicon carbide, or carbon fibre bundles for reinforcement.

Figure 5:
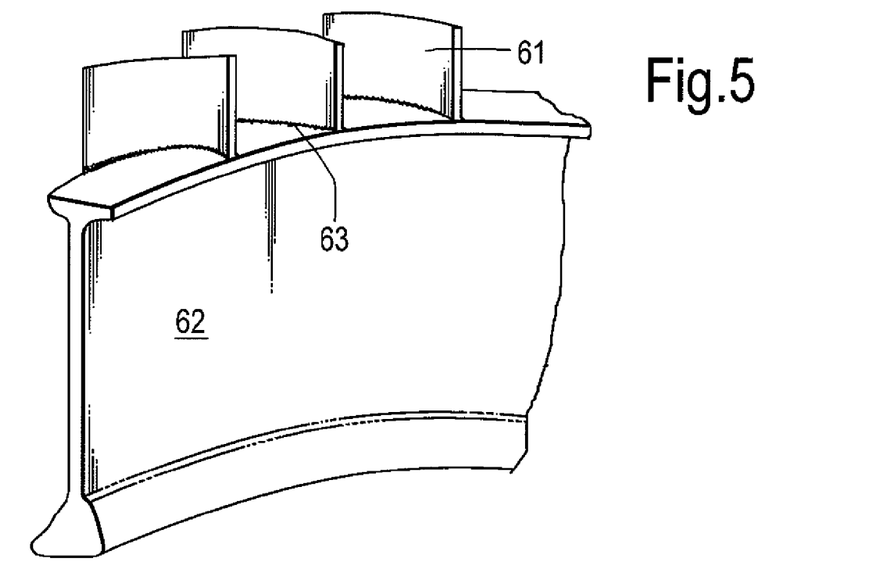
FIG. 5 is a pictorial view of a blade assembly segment in accordance with the invention.

In the above circumstances, it will be appreciated that the discontinuities formed in accordance with aspects of the present invention may also be associated with the rotor element in forming a blade assembly. FIG. 5 illustrates such attachment of blades 61 to a rotor element 62 through welds 63. In such circumstances, the blades are appropriately presented for operational performance upon the rotor element 62 in the form of a ring. In particular, failure at the weld 63 or of a section of the disc 62 may result in release of the blade 61 in operational use or multiple fragments thereof.

Figure 6:
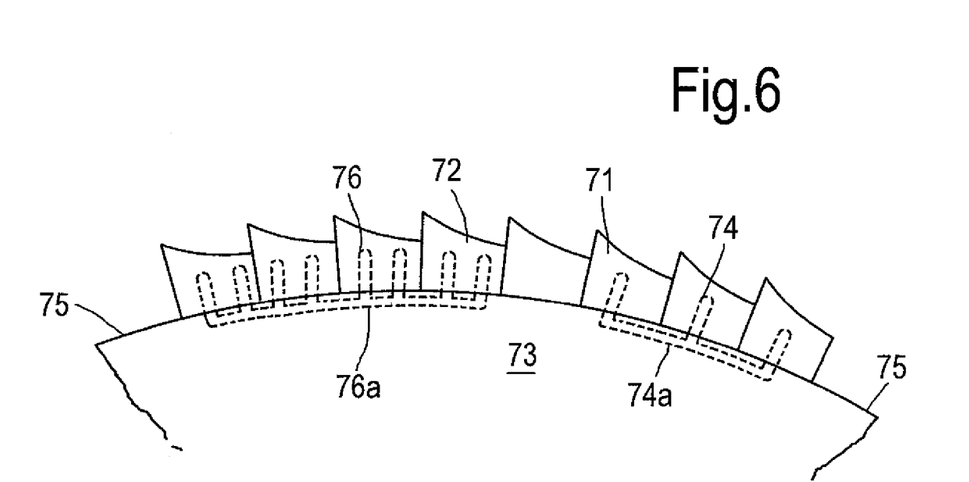
FIG. 6 is a front view of a blade assembly segment in accordance with a first embodiment of the invention.

FIG. 6 provides an example of blades 71 and blades 72 associated with a rotary element 73 through welds as described previously.

Blades 71 are secured to the rotor element 73 such that discontinuities 74 extend from the blade 71 into a circumferential discontinuity path 74*a*, which extends along a peripheral circumferential surface 75 of the rotor element 73. With regard to blade 71 a single discontinuity in the form of a slot is presented within each blade 71. With regard to blade 72 it will be noted that discontinuities 76 are provided such that there are two such discontinuities per blade 72 with again a circumferential discontinuity portion 76*a* extending about a peripheral circumferential surface 75 of the rotor element 73. In such circumstances it will be understood that the respective initial flexing of the blades under loads will act about the discontinuity 76. As the discontinuities 74*a*, 76*a* extend circumferentially generally these discontinuities 74*a*, 76*a* will not facilitate fragmentation and energy absorption by the rotor element 73 during impact. Nevertheless, by provision of a single discontinuity 74 or a double discontinuity 76 the respective blades 71, 72 upon impact with a casing for example will flex about these discontinuities for impact energy absorption prior to further fragmentation along these lines of weakness. Nevertheless, the provision of the circumferential discontinuity segment 74*a*, 76*a* may precipitate better distortion response from the blade 71, 72 upon impact as it will be appreciated the discontinuity 74, 76 within the blade 71, 72 will be open upon fragmentation and detachment from the rotor element 73. The discontinuity in such circumstances not only extends within a blade 71, 72 itself but also to other blades as well as peripherally into the rotor element 73.

Figure 7:
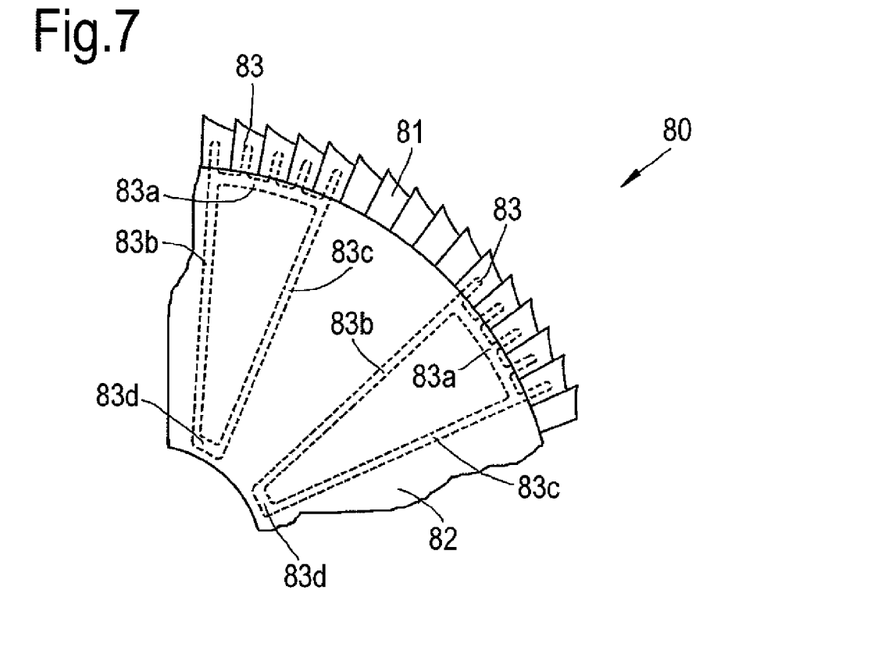
FIG. 7 is a pictorial front view of a blade assembly in accordance with a second embodiment of the invention.

FIG. 7 illustrates a blade arrangement 80 in which blades 81 are secured to a rotor element 82 through appropriate bonding as described above which may include welding or adhesives. Each blade 81 incorporates discontinuities although only some discontinuities are illustrated for clarity. Each blade has a discontinuity 83 which extends into the rotor elements 82 in the form of a disk and which extends in a circumferential portion 83*a*.

In accordance with the second embodiment depicted in FIG. 7, the discontinuity combination also incorporates radial portions 83*b*, 83*c*. Generally, there is a core portion 83*d* in a centre region between the radial portions 83*b*, 83*c*. In such circumstances, in addition to the discontinuities 83 providing flexing in the blades when fragmented, it will also be appreciated that discontinuities and particularly the radial portions 83*b*, 83*c* will also provide for slippage and cracking for plasticity and therefore energy absorption with regard to the rotor element 82 if it should impact with a casing element. The impact energy of these smaller portions of the rotor element 82 will be more easily contained by a casing.

In addition to provision of radial discontinuities 83b, 83c, it will also be understood that discontinuities could be provided in other forms such as isogrid, matrix, cascading triangles and other shapes in order to precipitate plasticity along a discontinuity. The form chosen will be dependent upon particular requirements for particular operational performance. The design of the discontinuities is such that loads from normal operation, such as fluid and centrifugal loadings, are not greater than elsewhere in the assembly. The direction, size and position are chosen to be weak in fragment impact and remain above working load requirement in twist and radial. This is done using stress analysis and modelling, confirmed by destructive testing.

Figure 8:
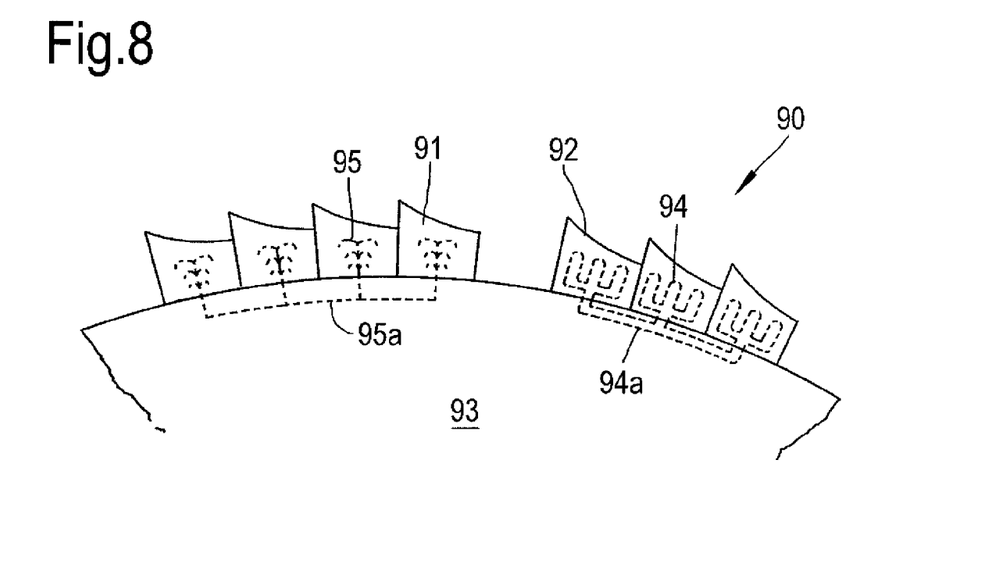
FIG. 8 is a front pictorial view of a third embodiment of a blade assembly in accordance with the invention.

FIG. 8 illustrates third and fourth embodiments, in which discontinuities are provided through ties or strings of material within an assembly 90 comprising blades 91, 92 secured through bonding such as by welding or adhesive to a rotor element 93. In the third and fourth embodiments, each blade 91, 92 includes discontinuities comprising branched elements 94 or fir tree elements 95 which extend into the blade. These elements (links, fibres, ties) 94, 95 will effectively unzip sections of the respective blades 91, 92 to help them fold and flex under impact to absorb energy but help retain fragments attached to each other to make them easier to catch. As again will be noted, these elements 94, 95 are connected to each other through circumferential portions 94a, 95a within a peripheral circumferential surface of the rotor element 93.

For the avoidance of doubt, although described principally above with regard to a disk or a blisk type blade arrangement, it will also be understood that the invention can also be utilized in bling type arrangements and blum type arrangements in which the blades are secured respectively to rings or drums as rotary elements.

It will be noted in operation generally the discontinuities in accordance with the invention are embedded within the assembly. In such circumstances no final machining of the blade is required as all the discontinuities are formed initially within the blade and/or the rotary elements. Avoidance of such final stage machining will avoid scrapping of highly valuable components should tool or other failures occur.

As the discontinuities, whether in the form of voids or cavities or areas of material having a reduced mechanical strength or lack of bonding with juxtaposed parts of the respective blade or rotary element, are sealed or embedded it will be understood that the ingress of fluids during the lifetime of the blade will be avoided. In this way, moisture, which may create freeze thaw cycling and therefore cracking within the blade or rotary section, can be avoided. Furthermore, by providing an embedded discontinuity it will be understood that traditional "tap" testing and ultrasonic testing can still be utilized with regard to quality assurance procedures with respect to the blade arrangements.

The discontinuities may extend radially or circumferentially within respective blades as well as into the rotary element upon which the blades are secured. In comparison with providing a hollow cavity, root stress concerns about the junction association between the blade and the rotary element can be avoided by placing of the slots as required. It will be understood that aspects of the present invention allow blade arrangements to be formed which have a greater degree of design flexibility in terms of slot shape, size and position in comparison with the requirements for a hollow cavity root in a blade assembly in accordance with previous approaches.

It will be understood with regard to blade arrangements an overriding design consideration is that the design of the blade arrangement should remain secure and strong during normal operation, that is to say under typical working loads, but will break under impact with the casing. This impact with the casing will be initially through the flexing and therefore energy dissipation approach as described above with regard to FIG. 2 and subsequently there will typically be further fragmentation along the discontinuities in accordance with aspects of the present invention.

Although embodiments of the present invention have been described above with regard to a blisk assembly, they are equally applicable to arrangements in blades which are assembled with a joint by bonding or welding to a disk, a ring or a drum to form a blisk, bling or blum. Aspects of the present invention are applicable to many types of blade section manufacture in which discontinuities can be created. Manufacturing techniques and methods which form blisks, blings and blums which can incorporate discontinuities can also be provided in accordance with aspects of the present invention. These other methods include prefabrication, composite construction, use of carbon fibre, graphite fibre, Aramid, metallic fibres or a mixture of the same in order to create composite assemblies which may have a metal sheath, skin or protective surface or skeleton. It will also be understood that blades which may be hollow or incorporate a honeycomb section can also include discontinuities in accordance with aspects of the present invention in that initial slippage and cracking along the discontinuity will allow energy absorption before further impact fragments and/or distortion of the blade in use.

Modifications and alterations to aspects of the present invention will be appreciated by those skilled in the art. Thus for example discontinuities as described above can take a number of forms including planar sections or slots within the blades. Alternatively, these slots may taper radially from an inner to an outer blade or rotor section as well as circumferentially across the blade or rotor element. In such circumstances tapering flexing response as well as subsequent load concentration to precipitate fragmentation can be achieved. Generally, voids will be utilized in order to create discontinuities. These voids may be filled with an appropriate material to allow shear dislocation along the discontinuity surfaces with juxtaposed portions of the blade or rotor element for energy absorption or damping before further impact precipitates fragmentation.

What is claimed is:

1. A blade assembly comprising:
   a rotor element and a plurality of blade elements integrally secured to the rotor element, said rotor element being one of a blisk, a bling, or a blum,
   said rotor element and at least one of said blade elements enclosing at least one discontinuity therein, the at least one discontinuity extending radially and circumferentially across a junction between the rotor element and the at least one blade element to allow intermediate flexing of the respective rotor element and/or blade element upon impact prior to fracture.

2. The assembly as claimed in claim 1 wherein the at least one discontinuity is provided by lack of bonding or fixed association between juxtaposed parts of the blade or rotor element.

3. The assembly as claimed in claim 2 where the lack of bonding is caused by a bond resistant or stop-off material as part of the component manufacture or assembly.

4. The assembly as claimed in claim 1 wherein the at least one discontinuity is provided by a void or slot.

5. The assembly as claimed in claim 1 wherein the at least one discontinuity is provided by a section of material of differing strength than the material from which the rotor element or the blade element is formed.

6. The assembly as claimed in claim 1 wherein the blade elements are bonded to the rotor element.

7. The assembly as claimed in claim 1 wherein a part of the at least one discontinuity extends circumferentially within the rotor element.

8. The assembly as claimed in claim 1 wherein at least one of said rotor element or said blade element is formed from a composite construction comprising a plurality of layers or laminates with discontinuities formed between those layers or laminates.

9. A method of making a blade assembly comprising an integral rotor element and blade elements secured to the rotor element, the rotor element being a blisk (bladed disk) or bling (bladed ring) or blum (bladed drum), said method comprising the steps of:
    defining a first layer or laminate for the blade assembly, applying a mask incorporating a blank to define at least one discontinuity extending radially and circumferentially across a junction between the rotor element and at least one of the blade elements, applying a second laminate layer to enclose the at least one discontinuity, and applying any further masked layers and laminate layers until a desired blade structure is achieved.

10. The method as claimed in claim 9 further comprising the steps of: retaining the blank within the blade structure to act as a discontinuity.

11. The method as claimed in claim 9 further comprising the steps of: removing the blank within the mask in order to define a void or slot to act as a discontinuity within the blade arrangement.

12. The method as claimed in claim 9 further comprising the steps of: removing the blank in the mask layer and filling the void created with a material of lower strength than the laminate layers to define the discontinuity.

13. A gas turbine engine comprising:
    an air intake;
    a propulsive fan;
    an intermediate pressure compressor;
    a high pressure compressor;
    a combustor;
    a turbine assembly having a high pressure turbine, an intermediate pressure turbine, a low pressure turbine, and an exhaust nozzle; and
    wherein at least one of said compressor or said turbines includes a blade assembly having an integral rotor element and a plurality of blade elements secured to the rotor element, said rotor element and at least one of said blade elements enclosing at least one discontinuity, the at least one enclosed discontinuity extending radially and circumferentially across a junction of the rotor element and the at least one blade element to allow intermediate flexing of the respective rotor element and/or blade element upon impact prior to fracture.

\* \* \* \* \*